Dec. 17, 1957 G. R. KUNZELMAN 2,816,640

TYPE BAR ACTIONS FOR TYPEWRITERS

Filed Aug. 16, 1954 5 Sheets-Sheet 1

GEORGE R. KUNZELMAN
INVENTOR

BY Theodore E. Simonton
ATTORNEY

TYPE BAR ACTIONS FOR TYPEWRITERS

Filed Aug. 16, 1954 5 Sheets-Sheet 2

GEORGE R. KUNZELMAN
INVENTOR

BY Theodore E. Simonton
ATTORNEY

Dec. 17, 1957 G. R. KUNZELMAN 2,816,640

TYPE BAR ACTIONS FOR TYPEWRITERS

Filed Aug. 16, 1954 5 Sheets-Sheet 3

GEORGE R. KUNZELMAN
INVENTOR

BY Theodore E. Simonton
ATTORNEY

Dec. 17, 1957 G. R. KUNZELMAN 2,816,640

TYPE BAR ACTIONS FOR TYPEWRITERS

Filed Aug. 16, 1954 5 Sheets-Sheet 4

GEORGE R. KUNZELMAN
INVENTOR

BY Theodore E. Simonton
ATTORNEY

GEORGE R. KUNZELMAN
INVENTOR

BY Theodore L. Simonton
ATTORNEY

United States Patent Office 2,816,640

Patented Dec. 17, 1957

2,816,640

TYPE BAR ACTIONS FOR TYPEWRITERS

George R. Kunzelman, Syracuse, N. Y., assignor to Smith-Corona Inc., Syracuse, N. Y., a corporation of New York Application August 16, 1954, Serial No. 450,061

18 Claims. (Cl. 197—30)

The invention relates to improvements in type bar actions for typewriters, and its principal purposes are to provide improved individual type bar actions and an improved system or set of type bar actions of the key-operated and spring-returned class affording easy starting key touch, uniformity of extent of key dip, uniformity of touch for all of the keys, high terminal velocity of all type bars on their printing strokes for sharp and clear type imprints and for good manifolding typing, and a high degree of liveliness of the actions and responsiveness thereof to finger pressure on the keys.

The invention will be explained with reference to a system of front strike pivoted type bars mounted in a normally cumbent arcuate array in a case shiftable type bar segment and selectively operable to print by keys arranged in straight banks or rows which extend transversely of the typewriter. A particular purpose of the invention is to provide an improved system of type bar actions for such a system of type bars.

An important feature of the invention is the provision of a row of type bar actuating sub-levers which are individually connected directly by links in an improved manner with the key levers to be rocked through equal angles at like accelearted rates by equal total extents of dip of the keys and with like key touch for all of the keys.

Other features and advantages of the invention will appear hereinafter.

Figures 2, 3:
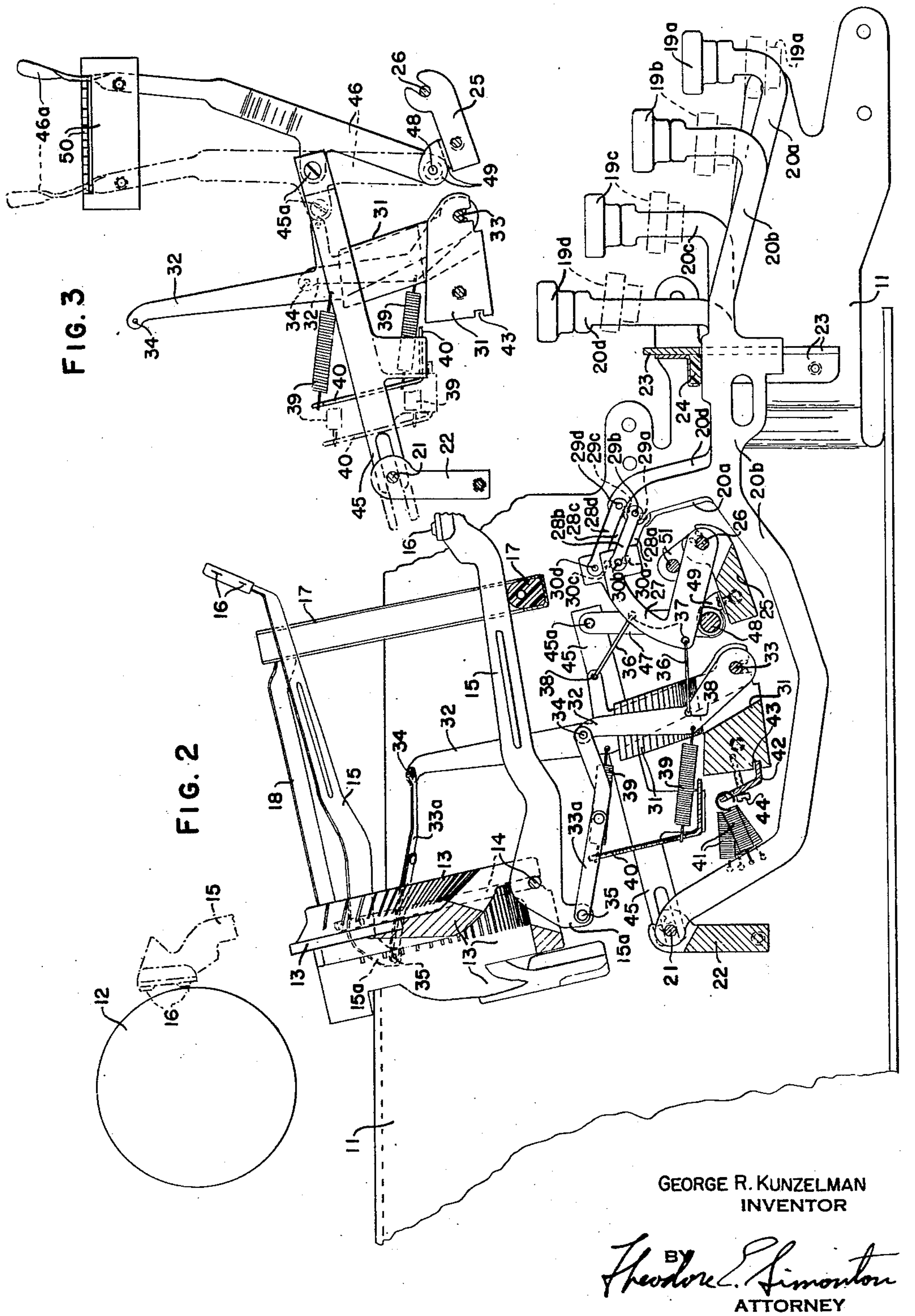
Figure 2 is a fragmentary vertical sectional view taken medially of the system of type bar actions on line 2—2 of Figure 1.
Figure 3 is a detail sectional view on line 3—3 of Figure 1 showing features of means for regulating the touch of the type bar action keys.

The typewriter has a main frame comprising upstanding left and right hand side plates 10 and 11, and also has the usual roller platen 12 supported by a carriage, not shown, for travel transversely of the machine over the rear portion of the main frame past the printing point of the typewriter. It also has the usual radially slotted type bar segment 13 carrying the usual arcuate type bar fulcrum rod 14 about which the type bars 15 swing to bring their types 16 to the common printing point of the typewriter at which the types impact the platen. The segment and its fulcrum wire, together with the usual arcuate type bar rest 17, attached to the segment by the usual side arms 18, one of which arms is shown in Figure 2, support the type bars normally cumbent in an arcuate array for selective swinging through printing strokes of 90 degrees, the segment and attached type bar rest being slightly upwardly and rearwardly inclined, as is common in the art.

By means not shown, the segment and attached type bar rest normally are supported in the position shown to condition the typewriter for typing lower case characters, and are downwardly and forwardly case shiftable to condition the typewriter for typing upper case characters, as also is common in the art.

The type bars are selectively actuative for typing characters at the common printing point of the typewriter at which the platen backs paper to receive the type impacts, each type bar being actuative by a different one of the keys of the usual universal keyboard of the typewriter, which keys are arranged, as usual, in four stepped and fore-and-aft spaced banks of keys. The first, second, third and fourth bank keys are designated $19^a$, $19^b$, $19^c$ and $19^d$, respectively, and are carried respectively on the forward ends of an array of parallel fore-and-aft extending first, second, third and fourth bank key levers $20^a$, $20^b$, $20^c$ and $20^d$. All of the key levers are fulcrumed at their rear ends on a common straight fulcrum rod 21 which extends horizontally and transversely of the typewriter. This rod is carried by a horizontal key lever fulcrum bar 22 which extends horizontally between the main frame side plates and is fixedly secured at its ends to said plates, said bar and rod, in the machine shown, being located below the type bar segment. The key levers are guided at their rear ends in parallel vertical slots in bar 22 and are guided adjacent the rear of the keyboard in parallel vertical slots in a key lever guide comb 23. This comb, and an adjacent horizontally disposed key lever stop device 24, extend between the main frame side plates and are fixedly secured thereto, the key levers being normally yieldingly held rocked upward against the stop device.

By novel connections about to be described, each type bar is operable by a different one of the key levers to print. Before proceeding with the description of the connections between the key levers and the type bars, it is pointed out that the keys are movable through arcs about fulcrum rod 21, the respective radii of these arcs decreasing from that of first bank keys to that of the fourth bank keys. Consequently, for uniform maximum dip of all of the keys, the maximum angular movement of the key levers about their fulcrum rod must increase from that of the first bank key levers to that of the fourth bank key levers. In the machine shown, and as is common in the art, the second and third, and the third and fourth, banks of keys are equally spaced fore and aft of the machine, while the first and second banks of keys have a slightly less fore and aft spacing, and the effective lengths of the key levers from bank to bank vary accordingly, as also do the angles of throw $a^1$, $a^2$, $a^3$ and $a^4$ of the first, second, third and fourth bank key levers, respectively. It also is pointed out that, as is common in the art, the two medial type bars in the segment are fulcrumed on their arcuate pivot wire 14 at equal distances from the lowest point of said wire and at opposite sides of a medial fore-and-aft vertical plane through the segment and keyboard. The novel connections between the key levers and type bars now will be described.

A sub-lever fulcrum bar 25 extends across the main frame between the side plates 10 and 11 and is fixedly secured thereto. Said bar extends below the forward portion of the array of type bars and above the array of key levers and carries a common and straight fulcrum rod 26 which extends horizontally across the machine and the array of key levers. Fulcrumed at their lower ends on rod 26 are the several sub-levers or rockable members 27 of a row of preferably substantially sickle shaped normally upstanding sub-levers or rockable members whose lower ends are guided in vertical slots in bar 25, there being one such sub-lever or rockable member for each key lever and type bar. Each sub-lever 27 has a straight portion which normally extends upward and rearward from the fulcrum rod, and the upper end of each sub-lever is connected with said straight portion by an arcuate portion which is concentric with the fulcrum rod and normally curves upwardly and forwardly from the straight portion of the sub-lever. In the normal idle positions of the type bar actions the straight portions of the sub-levers are in register across the typewriter, as also are the arcuate portions of the sub-levers, so that all of the sub-levers stand in identical angularly rotated positions about their common straight fulcrum rod 26 in the normal idle positions of the several type bar actions.

Each key lever has an arm which extends upwardly behind the keyboard between the key lever guide comb 23 and the row of sub-levers 27. Each such key lever arm is directly connected at its upper end by a link with the upper end of a different one of said sub-levers 27 for forward rocking of the sub-levers from their normal idle positions by depression of the keys carried by the key levers. Through the novel arrangement of said connections between the key levers and the sub-levers 27, now to be described, the sub-levers 27 are all rockable forwardly through one and the same angle at one and the same rate of acceleration by one and the same extent of key depression at one and the same rate, the key touch or resistance to depression also being the same for all keys at any given point in the down strokes of the keys.

Figures 4, 5:
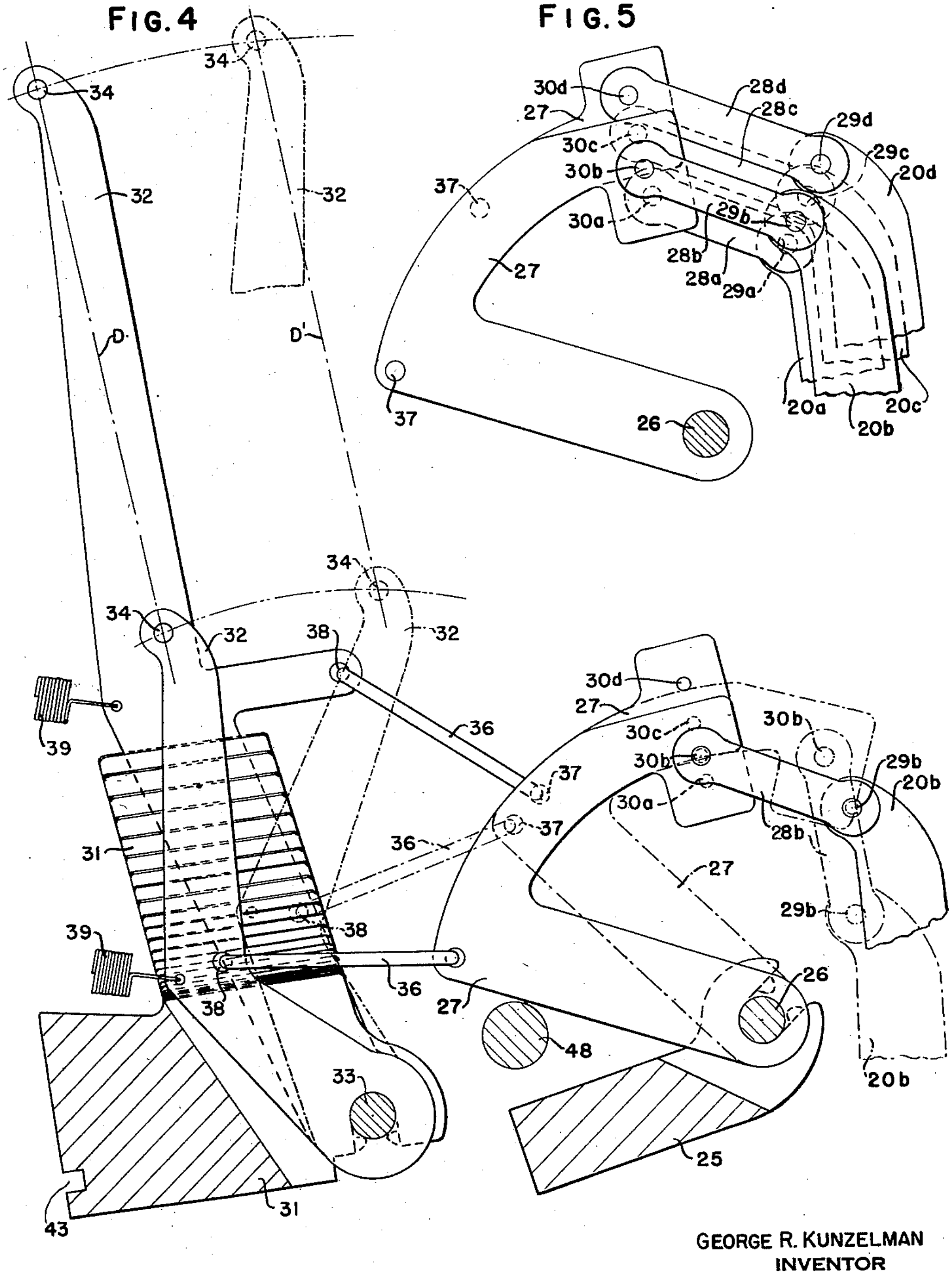
Figure 4 is a detail view on an enlarged scale and taken on the same line of Figure 2, the view showing features of a medial and of an end type bar action.
Figure 5 is a detail view showing features of the link connections between the four banks of key levers and the row of sub-levers or rockers which are directly linked to the key levers.

For so actuating the sub-levers 27, the upper ends of the upwardly extending arms of the first, second, third and fourth bank key levers are connected respectively by normally fore and aft extending links 28$^a$, 28$^b$, 28$^c$ and 28$^d$ with the upper ends of the sub-levers 27 to be actuated thereby. Horizontal transversely extending pivots 29$^a$, 29$^b$, 29$^c$ and 29$^d$ connect the forward ends of links 28$^a$, 28$^b$, 28$^c$ and 28$^d$, respectively, with said key lever arms, and the rear ends of said links 28$^a$, 28$^b$, 28$^c$ and 28$^d$ are connected respectively by horizontal transversely extending pivots 30$^a$, 30$^b$, 30$^c$ and 30$^d$ with the sub-levers which are to be actuated thereby, see particularly Figure 5. The links lie in, and travel in, parallel vertical planes spaced transversely of the main frame of the typewriter.

Pivots 29$^a$, 29$^b$, 29$^c$ and 29$^d$ connect first, second, third and fourth bank key levers respectively with links 28$^a$, 28$^b$, 28$^c$ and 28$^d$ at points on the key levers the respective radial distances of which from the key lever fulcrum rod 21 vary inversely as the effective lengths of the key levers to which said pivots connect said links vary. The respective effective lengths of the levers are, of course, the radii of the arcs hereinbefore mentioned through which the first, second, third and fourth bank keys 19$^a$, 19$^b$, 19$^c$ and 19$^d$ move about the key lever fulcrum rod 21, the chords of these arcs being substantially vertical. In the normal idle positions of the type bar actions, pivots 29$^a$, 29$^b$, 29$^c$ and 29$^d$, respectively, are located progressively farther outward from the sub-lever fulcrum rod 26 in a plane which radiates upwardly and forwardly from said rod and which is indicated in Figures 6, 7, 8 and 9 by the line B. Due to the fact that the effective lengths of the key levers decrease by like increments from the second to the fourth bank key levers and by a lesser increment from the first to the second bank key levers, as hereinbefore described, the increments of spacing of said pivots in plane B are proportionately smaller between pivots 29$^a$ and 29$^b$ than between 29$^b$ and 29$^c$ and between pivots 29$^c$ and 29$^d$, as shown.

Pivots 30$^a$, 30$^b$, 30$^c$ and 30$^d$ connect, respectively, links 28$^a$, 28$^b$, 28$^c$ and 28$^d$ to their associated sub-levers 27 at points which are so located that pivots 30$^a$ have one spacing from the sub-lever fulcrum rod 26, pivots 30$^b$ have a greater spacing from said rod, pivots 30$^c$ has a still greater spacing from said rod, and pivots 30$^d$ have the greatest spacing from said rod, said spacings being such that, in the normal idle positions of the type bar actions, all of the connecting links 28$^a$, 28$^b$, 28$^c$ and 28$^d$ are parallel longitudinally and the links 28$^a$, 28$^b$, 28$^c$ and 28$^d$ are arranged respectively in four different parallel rows of links which are spaced, respectively, at increasing distances from the fulcrum rod 26. The points of the link connections to the bellcrank sub-levers 27, moreover, are so arranged that all of the pivots 30$^a$, 30$^b$, 30$^c$ and 30$^d$, in the normal idle positions of the type bar actions, lie in a second plane which radiates upwardly and rearwardly from the sub-lever fulcrum rod 26 and which is indicated in the drawings by the line C.

Because of the aforesaid arrangement of their pivotal connections with the key levers and sub-levers, the lengths of the links increase progressively from that of links 28$^a$ to that of links 28$^d$, and the rows of links normally connect along parallel lines the sides of the angle included between planes B and C to form similar equiangular triangles of a different size for each bank. The locations of planes B and C can be varied. The normal angles of inclination of the rows of links with respect to plane B and to plane C can also be varied so long as the links are all longitudinally parallel and the angle of inclination of the links to plane C within the triangles formed by planes B and C and the links is not greater than 90 degrees, the preferred such angle of the links to plane C being approximately 60 degrees, as shown. For compactness, and for over-all efficiency in operation, it is preferred to so arrange the parts that, in their normal idle positions, the links extend at somewhat less than a right angle to plane B; that planes B and C are so located that pivots 30$^a$, 30$^b$, 30$^c$ and 30$^d$ move forward to a plane indicated by the line C′ and, in so doing, move through concentric arcs whose chords are substantially horizontal; and that pivots 29$^a$, 29$^b$, 29$^c$ and 29$^d$ move downward to a plane indicated by the line B′ and also move, like the respective banks of keys, through concentric arcs whose chords are substantially vertical.

As is apparent, particularly from Figures 6 to 9, the radii of the arcs through which pivots 29$^a$ to 29$^d$ move increase in length from those for pivots 29$^a$ to those for pivots 29$^d$ in direct ratio to the respective angles of the throw of the banks of key levers to which said pivots are connected and in inverse ratio to the respective lengths of said key levers, and the same things are true of the radii of the arcs through which pivots 30$^a$ to 30$^d$ move. Pivots 29$^a$ to 29$^d$ move in four parallel arcuate paths around rod 21, and pivots 30$^a$ to 30$^d$ move in four parallel arcuate paths around rod 26, so that the four rows of links 28$^a$ to 28$^d$ travel in four parallel paths in which each link is longitudinally parallel to the other links at each like angular interval of travel. The key levers 20$^a$, 20$^b$, 20$^c$ and 20$^d$ with their respective connected links 28$^a$, 28$^b$, 28$^c$ and 28$^d$ form four sets of key-carrying toggles whose common fixed anchorage is fulcrum rod 21 and whose respective movable anchorages are the pivotal connections 30$^a$, 30$^b$, 30$^c$ and 30$^d$ of said links with the sub-levers 27. Within each set, all of the toggles are congruent, but the overall lengths of the toggles increase from set to set from the toggles formed by first bank key levers 20$^a$ and links 28$^a$ to the toggles formed by fourth bank key levers 20$^d$ and links 28$^d$. All of said toggles normally are identically folded or collapsed and they all unfold identical extents toward, but not beyond a right angle condition of fold, so that all of the toggles have identical starting and finishing angles of pull on the sub-levers 27. All of the keys, accordingly, have the same maximum dip and the same purchase on the sub-levers actuated thereby, impart the same angle of rocking movement to the sub-levers actuated thereby and, when depressed at the same rate, rock the sub-levers at identically accelerating rates.

Each type bar 15 of the arcuate array of type bars is connected with a different one of the sub-levers 27 in such a way that the aforesaid uniformities of actions of the keys on the sub-levers are transmitted to the type bars of the array. Preferably, and as shown, the connections between the sub-levers 27 and type bars are such as to provide a uniformly increased rate of acceleration for the type bars over the aforesaid uniform rate of acceleration of the sub-levers. This illustrated system of connections now will be described, said system being similar to that provided for like purposes in the typewriter disclosed in United States Patent No. 2,684,145 to Hill and Kunzelman, granted July 20, 1954.

Extending transversely of the typewriter between fulcrum bars 22 and 25, and fixedly secured at its ends to the main frame side plates, is a second sub-lever fulcrum bar 31 having, in its forward edge, vertical and parallel guide slots for the lower portions of upstanding sub-levers 32 of the third order, which sub-levers are arranged in a straight row across the machine and are fulcrumed at their lower ends on a common and straight fulcrum rod 33 which extends horizontally parallel to the fulcrum rods 21 and 26 and is carried in the slotted forward portion of bar 31. This row of sub-levers extends across the machine below the medial portion of the arcuate array of type bars, and the slotted portion of bar 31 is graded upward in height from its middle toward its ends for good lateral support of the sub-levers 32 which are similarly graded upward in length from the two medial sub-levers to the two end sub-levers of the row, said two medial sub-levers being of the same length and, like the two medial type bars to which they are connected, being equidistant from the vertical medial fore and aft plane of the system of type actions.

As is usual, the upper ends of the sub-levers 32 are bent progressively inward toward said medial plane of the system of type actions, and laterally parallel links 33[a] of identical length are connected in an arcuate array respectively to said upper ends of the sub-levers and to the heels 15[a] of the type bars by pivots 34 and 35, respectively. Pivots 34 and 35, as is usual, normally lie in arcs which are concentric with the arcuate type bar fulcrum rod 14 and which are disposed in planes parallel to the plane containing rod 14, and links 33[a] swing, as usual, about pivots 34 when the type bar segment is case shifted.

Figures 8, 9:
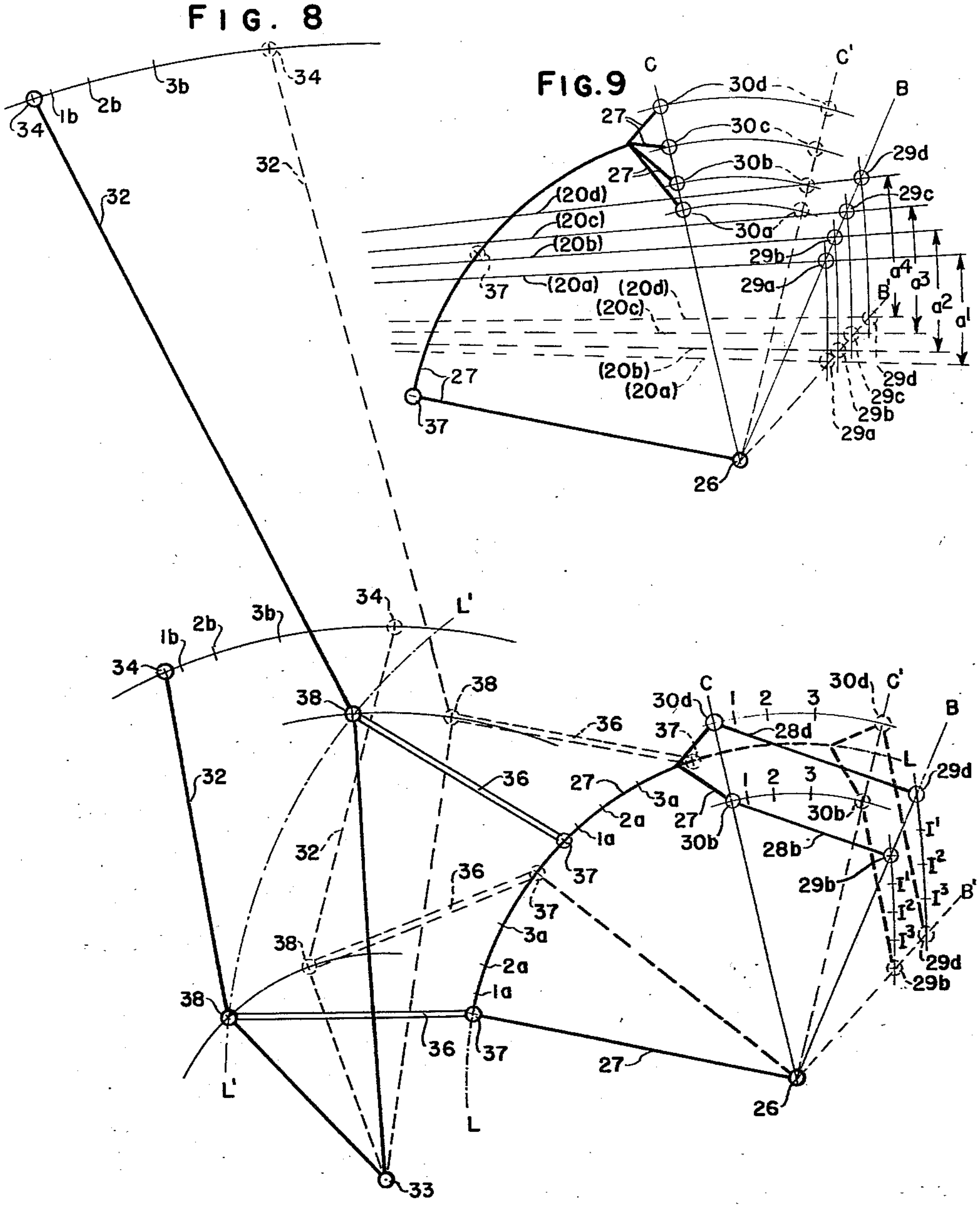

Each sub-lever 27 is connected with a different one of the sub-levers 32 by a different one of a system of links 36 of identical lengths, said links lying in parallel vertical planes and extending fore and aft of the machine. These links are connected with the sub-levers 27 by pivots 37 and with the sub-levers 32 by pivots 38. In the normal idle positions of the type bar actions, all of the pivots 37 lie in a cylindrical locus L whose axis is coincident with fulcrum rod 26 of sub-levers 27, and all of the pivots 38 lie in a concentric cylindrical locus L′ of larger radius, as indicated in Figure 8, said pivots 38 being located at constant leverage ratio points on the graded sub-levers 32.

The arrangement of the sets of pivots 37 and 38 is such that each sub-lever 27 and its connected link 36 forms a different one of a system of congruent toggles, which toggles normally are equally and substantially fully extended and radiate from a common fixed anchorage (fulcrum rod 26) to movable anchorages (pivots 38) connected to sub-levers 32 at constant leverage ratio points on the latter sub-levers, the hinges of the toggles being pivots 37 which normally lie slightly above straight lines connecting the anchorages of the respective toggles. The normally equally extended congruent toggles fold equally toward, but not beyond, a right angle relation of the toggle elements, as now will be explained, so that the toggles have identical starting angles of pull on sub-levers 32 and identical finishing angles of pull on said sub-levers.

Since the sub-levers 27 are rocked through equal angles by equal depressions of the keys, it will be obvious that full key depressions will fold the equally extended toggles equal extents and rock the respective graded sub-levers 32 forwardly through such respective angles that pivots 34 at the upper ends of these sub-levers will all swing from plane D to plane D′ (Figures 4 and 6) through arcs of like chordal amplitude and impart printing strokes of like amplitude to the type bars. The folding of these toggles affords an identical accelerating action of the toggles on levers 32 which is superimposed on the accelerating action imparted to bellcrank sub-levers 27 by the keys. Consequently, in response to key depression at any fixed rate, all type bars are movable through printing strokes of equal amplitude at identical accelerating speed rates, and the key purchase on all type bars at any given point in the depression key stroke is identical for all keys.

The type bar actions are returned from printing to idle position by two systems of springs, and means are provided to variably adjust or regulate the key touch, all constructed and arranged similarly to like type bar action returning and key touch regulating means disclosed in the aforesaid Hill and Kunzelman patent. These means, therefore, need be only briefly described.

The type bar actions primarily are returned by a system of identical and normally arcuately arrayed springs 39 which are connected at their forward ends to sub-levers 32 at constant leverage ratio points on said sub-levers and are connected at their rear ends to an anchor bar 40 with the ends of the springs all normally located in planes parallel to planes D and D′ and all of the springs normally extending at the same angle to said planes, so that returning springs 39 are identically stretched by full printing actuation of the respective type bar actions and said springs all are under the same normal stress or tension and all have the same effective purchase on the sub-levers 32 of the respective actions.

The type bar actions are returned secondarily by a system of identical springs 41 which are connected at their forward ends along a straight horizontal line extending transversely of the machine with one edge of a spring anchor bar 42, and which are connected at their rear ends with the key levers with the rear ends of springs 41 for different banks of keys normally located in an arc concentric with the aforesaid line, the rear anchorage points progressively receding from the key lever fulcrum rod from those for the fourth bank key levers to those for the first bank key levers, so that said springs for the different banks of key levers all slightly and similarly over-counterbalance the weights of the key levers to which they are connected, as explained in the aforesaid patent and as is common in the art.

The anchor bar 42 for springs 41 is rockably engaged along its opposite edge in a horizontal groove 43 in fulcrum bar 31. Screws 44 extend through said anchor bar 42 and are threaded into fulcrum bar 31 for adjustment to hold bar 42 variably rocked to afford adjustment of the normal tension of springs 41.

For typist control of key touch, the anchor bar 40 for springs 39 is variably adjustable fore and aft of the machine in a path substantially normal to planes D and D′ by means disclosed in the aforesaid patent. Said bar is fixed to two side bars 45 which are pivoted at their forward ends at 45[a]—45[a] on the upper ends of upstanding rock arms 46 and 47 fixed on a horizontal rock shaft 48 journaled in bearing members 49 fixed to fulcrum bar 25. The longitudinally slotted rear ends of said side arms are guided on fulcrum rod 21 carried by fulcrum bar 22. One rock arm (arm 46) is extended upward to form a laterally flexible handle 46[a] adjustable forwardly and rearwardly in, and latchable to, a bracket 50 fixed to the left hand side plate 10 of the main frame, all as more fully shown and described in said patent.

Figure 1:
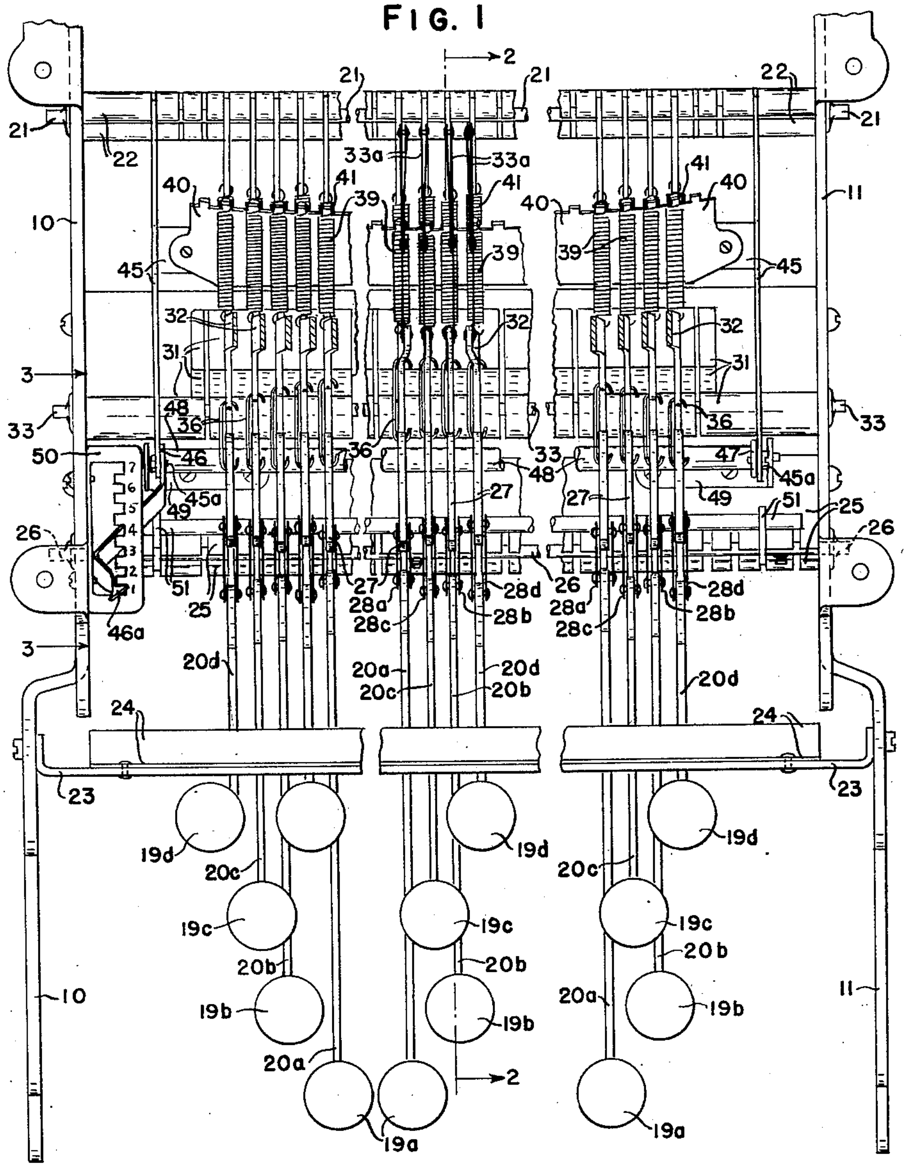
Figure 1 is a fragmentary top plan view of an otherwise known typewriter equipped with a system of type bar actions embodying the invention in its preferred form, certain parts of the typewriter being omitted, and others broken away, for clarity of illustration of features of the invention.

The improved machine shown preferably has a ribbon vibrator actuating universal bar 51 of bail-like form, the side arms of which universal bar are fulcrumed on rod 26 and the cross-bar of which is straight and is horizontally disposed, said universal bar being spring-returned, by means not shown, to a normal position in which its cross-bar is engaged close to rod 26 with the forward edges of the straight portions of the sickle-shaped sub-levers 27, all as shown in Figures 1 and 2, for easy and quiet operation of the universal bar by its sub-levers.

An important advantage of the invention consists in the relative rates of acceleration of sub-levers 27, sub-levers 32 and type bars 15 in response to equal increments of key depression at equal rates, in the good purchases of the keys and of returning springs 39 in all positions of the type actions, and in the very slow and easy type bar start and very high relative final type bar speed attained on the printing strokes of the type bars with a very light key touch and minimum loss of key leverage or key purchase on the type bars.

Figures 6, 7:
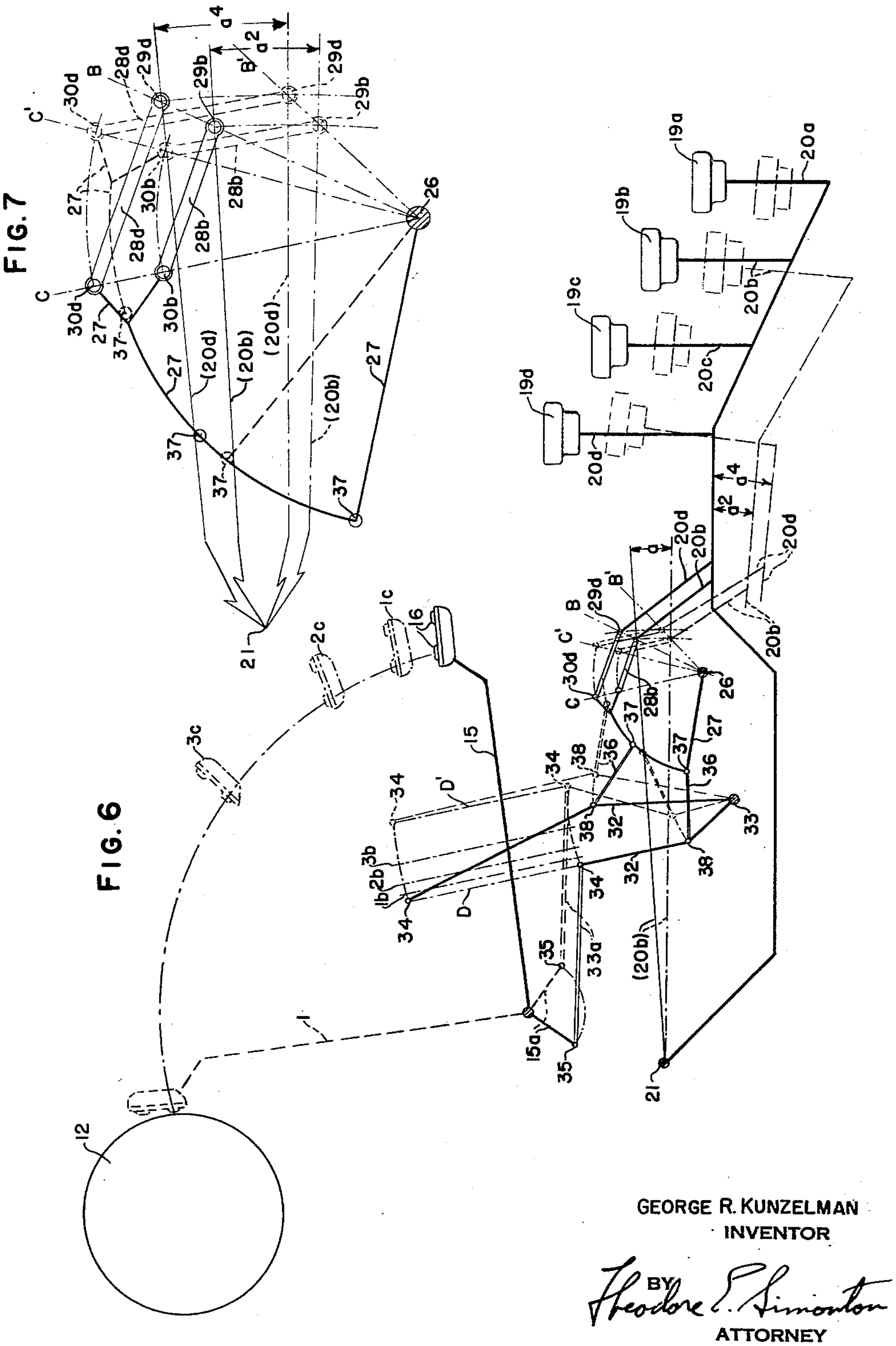
Figures 6 to 9 are schematic views, hereinafter described, illustrating features of construction and operation of the improved type bar action system.

Referring particularly to Figures 6 and 8, depression of any key through four equal increments at a constant rate will move the associated pivot $29^a$, $29^b$, $29^c$ or $29^d$ through four equal increments from normal to final actuated position, the intermediate positions being indicated at $I^1$, $I^2$, $I^3$ (Figure 8). While these equal increments of pivot movements are greater from pivots $29^a$ to $29^d$ they cause the sub-levers 27 to rock from normal to final actuated position through four progressively increasing angles, the intermediate angular positions being indicated at 1, 2 and 3 in Figure 8 and being identical for all sub-levers 27, thus causing the hinges 37 of all of the congruent toggles to move through corresponding angles, the intermediate positions of the toggle hinges being indicated at $1^a$, $2^a$ and $3^a$ in Figure 8. It will be noted that the sub-levers 27 move very little and at a slowly increasing rate during the first half, or more, of the key dip and move relatively far, and at a rapidly increasing rate, during the last half of the key dip, the relative extents and speeds of movement of said sub-levers increasing greatly during the final quarter of the key dip.

The sub-levers 32 are so rocked that their pivotal connections 34 with the type bar actuating links $33^a$ move in the same general accelerated manner as sub-levers 27, but at a still higher rate of acceleration, through arcs of equal chordal amplitude from normal to fully actuated position, the intermediate positions of pivots 34 being indicated at $1^b$, $2^b$ and $3^b$ in Figure 8. This causes the type bars to swing like extents from idle to printing position at like rates of acceleration, the acceleration rate of the type bars being apparent from the normal and printing positions of the type bar and the intermediate positions $1^c$, $2^c$, $3^c$ of the type bar per increment of key dip, shown in Figure 6.

In the specific construction shown, for each successive one-quarter dip of its actuating key, the type bar is swung from normal position toward printing position through angles of 6° 30′, 11° 40′, 22° 5′ and 49° 45′, respectively, while its actuating sub-lever 27 is swung through angles of 3° 20′, 5° 40′, 8° 10′ and 11° 45′, respectively. The type bars thus receive approximately two-thirds of their acceleration from the acceleration imparted to sub-levers 27 by the keys, and receive over one-half of their respective printing strokes from the final quarter of the key dip.

I claim:

1. In a typewriter, a system of type actions comprising type bars which are swingable upwardly and rearwardly through identical angles to print at a common printing point and which are normally cumbent in an arcuate type bar array which curves upwardly toward opposite sides of the typewriter, sub-levers upstanding from a common straight fulcrum axis which extends horizontally and transversely of the typewriter, the upper ends of said sub-levers normally being arrayed concentrically with the type bar array and each being so connected with a different type bar that forward movements of the upper ends of the sub-levers through arcs of identical chordal amplitude cause swinging of the type bars through said identical angles, congruent and normally identically extended toggles having a common fixed fulcrum axis which is forward of that of the sub-levers and parallel thereto, said toggles each having a pivotal anchorage to a different sub-lever with said anchorages located at uniform leverage points on the sub-levers which normally lie on a cylindrical locus which is concentric with said fulcrum axis of the toggles, groups of key levers varying in length from group to group and extending forwardly from a common fulcrum axis which is parallel to that of the toggles, groups of links varying in length from group to group, and pivotal connections so joining each link with a different key lever and toggle that the links normally are in parallelism longitudinally and the pivotal connections of the links to the key levers and to the toggles normally lie respectively in the foremost one and the rearmost one of two planes which converge downwardly to the toggle fulcrum axis, said links, from those of shortest length to those of longest length, being connected respectively to the key levers from those of longest length to those of shortest length.

2. In a typewriter, a system of type actions comprising type bars which are swingable upwardly and rearwardly through identical angles to print at a common printing point and which are normally cumbent in an arcuate type bar array which curves upwardly toward opposite sides of the typewriter, sub-levers upstanding from a common straight fulcrum axis which extends horizontally and transversely of the typewriter, the upper ends of said sub-levers normally being arrayed concentrically with the type bar array and each being so connected with a different type bar that forward movements of the upper ends of the sub-levers through arcs of identical chordal amplitude cause swinging of the type bars through said identical angles, congruent and normally identically extended toggles having a common fixed fulcrum axis which is forward of that of the sub-levers and parallel thereto, said toggles each having a pivotal anchorage to a different sub-lever with said anchorages located at uniform leverage points on the sub-levers which normally lie on a cylindrical locus which is concentric with said fulcrum axis of the toggles, groups of key levers varying in length from group to group and extending forwardly from a common fulcrum axis which is parallel to that of the toggles, groups of links varying in length from group to group, and pivots connecting each link to a different key lever and toggle with the links progressively from the shortest to the longest links connected to the key levers progressively from the longest to the shortest key levers, the link pivots to the toggles being so arranged as to move forwardly, and those to the key levers to move downwardly, throughout depression of the keys of the key levers, the links, progressively from those of shortest to those of greatest length, normally being increasingly displaced upward from the toggle fulcrum axis and extending along parallel lines from one of the other of two planes which converge downwardly to said fulcrum axis, the link pivots to the key levers normally lying in the foremost one, and those to the toggles in the rearmost one, of said planes.

3. In a typewriter, a system of type actions comprising type bars which are swingable upwardly and rearwardly through identical angles to print at a common printing point and which are normally cumbent in an arcuate type bar array which curves upwardly toward opposite sides of the typewriter, sub-levers upstanding from a common straight fulcrum axis which extends horizontally and transversely of the typewriter, the upper ends of said sub-levers normally being arrayed concentrically with the type bar array and each being so connected with a different type bar that forward movements of the upper ends of the sub-levers through arcs of identical chordal amplitude cause swinging of the type bars through said identical angles, congruent and normally identically extended toggles having a common fixed fulcrum axis which is forward of that of the sub-levers and parallel thereto, said toggles each having a pivotal anchorage to a different sub-lever with said anchorages located at uniform leverage points on the sub-levers which normally lie on a cylindrical locus which is concentric with said fulcrum axis of the toggles, key levers of varying lengths extending forwardly from a common fulcrum axis which is parallel to and rearward of that of the toggles, and links each so pivotally connected to a different key lever and toggle and all so varying in length inversely to the lengths of the key levers to which the links are connected that all of the links are actuative by identical extents of depression of the keys of all of the key levers to fold all of the toggles identical extents.

4. In a typewriter, a system of type actions comprising type bars which are swingable upwardly and rearwardly through identical angles to print at a common printing point and which are normally cumbent in an arcuate type bar array which curves upwardly toward opposite sides of the typewriter, sub-levers upstanding from a common straight fulcrum axis which extends horizontally and transversely of the typewriter, the upper ends of said sub-levers normally being arrayed concentrically with the type bar array and each being so connected with a different type bar that forward movements of the upper ends of the sub-levers through arcs of identical chordal amplitude cause swinging of the type bars through said identical angles, congruent and normally identically extended toggles having a common fixed fulcrum axis which is forward of that of the sub-levers and parallel thereto, said toggles each having a pivotal anchorage to a different sub-lever with said anchorages located at uniform leverage points on the sub-levers which normally lie on a cylindrical locus which is concentric with said fulcrum axis of the toggles, key levers of varying lengths extending forwardly from a common fulcrum axis which is parallel to and rearward of that of the toggles, and links so pivotally connected each to a different key lever and toggle and all so varying in length inversely to the lengths of the key levers to which they are connected that the toggles are foldable identical extents at identically accelerating rates toward, but not beyond, a right angle state of fold by depressions of the keys identical extents at identical constant rates.

5. In a typewriter, a system of type actions, as claimed in claim 4, wherein, by identical extents of depression of the keys, the links are unfoldable upwardly identical extents toward, but not beyond, a right angle state of fold relatively to the key levers from identical normal angles of fold of the links relatively to the key levers in which the links are folded rearwardly upon the key levers and have identical angles of pull on the toggles.

6. In a typewriter, a system of type actions, as claimed in claim 5, wherein the pivotal connections of the links to the key levers and toggles are so arranged that depressions of the keys which move the type bars through full printing strokes cause the pivotal connections of the links to the toggles to move forwardly through arcs whose chords are substantially horizontal and cause the pivotal connections of the links to the key levers to move downwardly through arcs whose chords are substantially vertical.

7. In a typewriter, a system of type actions comprising key levers of variant lengths between their keys and a common straight fulcrum axis of the key levers which extends horizontally and transversely of the typewriter, sub-levers having a common fulcrum axis parallel to that of the key levers, links of variant lengths so pivoted each to a different key lever and sub-lever, for rocking of the sub-levers through identical angles at identical accelerating rates by identical depressions of the keys at identical rates, that the links vary in length inversely to the lengths of the key levers to which they are pivoted and that normally the link pivots to the key levers lie in one and the link pivots to the sub-levers in another one of two planes which converge along the fulcrum axis of the sub-levers with the links in parallelism between said planes and receding from said fulcrum axis in the ascending order of the lengths of the links, pivoted type bars swingable upwardly and rearwardly through angles of identical amplitude to print at a common printing point and normally cumbent above the key levers in an arcuate type bar array which curves upwardly toward opposite sides of the typewriter, and means connecting each sub-lever to a different type bar for actuation of the type bars through complete printing strokes at identical accelerating rates in response to identical key depressions at identical constant rates.

8. A system of type actions comprising type bars supported for movement through printing strokes the amplitude of which is identical for all of the type bars, sub-levers rockable about a common straight and horizontal fulcrum axis and each so connected with a different type bar that the sub-levers are rockable through angles of identical amplitude from identical normal angularly rotated positions about their fulcrum axis to move the type bars through complete printing strokes, key levers rockable downwardly about a common fulcrum axis parallel to that of the sub-levers, said key levers each so supporting a different one of a set of keys that the keys normally are arranged in horizontal rows which are parallel to, and variantly spaced from, the key lever fulcrum axis, and links pivoted each to a different key lever and sub-lever at points so located that all of the sub-levers are rockable at identical rates of acceleration through the aforesaid angles of identical amplitude by identical extents of depression of the keys at identical constant rates.

9. A system of type actions, as claimed in claim 8, wherein each link is pivoted to a different key lever and sub-lever at such points that the links make identical angles with the key levers to which they are connected and also make identical angles with the sub-levers to which they are connected while the type actions are in normal position and that the links make identically decreased angles with the sub-levers and identically increased angles with the key levers in the printing positions of the type actions.

10. A system of type actions, as claimed in claim 8, wherein, in the normal positions of the type actions, the pivot of each link to a key lever is farther from the fulcrum axis of the key lever than the pivot of that link to a sub-lever, all of the links are in longitudinal parallelism between two planes which converge along the fulcrum axis of the sub-levers and in which the link pivots are located, and the link pivots are progressively spaced outward from said fulcrum axis of the sub-levers in said planes in inverse order to the spacings from the key lever fulcrum axis of the keys of the key levers to which the links are pivoted.

11. A system of type actions, as claimed in claim 10, in which the two planes in which the link pivots to the sub-levers and key levers normally are located are downwardly converging planes which are so located that depressions of the keys sufficient to impart full printing strokes to the type bars cause the link pivots to the sub-levers to move forwardly through arcs whose chords are substantially horizontal and cause the link pivots to the key levers to move downwardly through arcs whose chords are substantially vertical.

12. In a typewriter, a system of front strike type actions comprising pivoted type bars supported for printing strokes of identical amplitude and to a common printing point from normally cumbent positions of the type bars in an arcuate type bar array that curves upwardly toward opposite sides of the typewriter, key levers extending forwardly from a common straight fulcrum axis which extends horizontally and transversely of the typewriter, said key levers each supporting a different key of a set of keys which normally are arrayed in straight horizontal rows which are variably spaced forwardly from the fulcrum axis of the key levers and are in parallelism with said axis, sub-levers disposed between the set of keys and the fulcrum axis of the key levers and fulcrumed at their lower ends to rock about a common fulcrum axis which is parallel to that of the key levers, and links each pivoted to a different key lever and sub-lever at such points that the links make identical acute angles with the key levers and identical acute angles with the sub-levers in the normal positions of the type actions and make identical and less acute angles with the key levers and identical and more acute angles with the sub-levers in the printing positions of the type actions, the link pivots to the key levers and those to the sub-levers normally lying respectively in the foremost one and the rearmost one of two planes which converge downwardly to the sub-lever fulcrum axis with the pivots receding progressively in said planes from said axis in the inverse order of the spacings from the key lever axis of the keys of the key levers to which the links are pivoted.

13. A system of type actions comprising type bars movable through complete printing strokes the amplitudes of which are identical for all of the type bars, members rockable about a common straight and horizontally disposed fulcrum axis, means operatively connecting each member with a different type bar for actuation of the type bars through complete printing strokes in response to rocking of the members through identical angles about their fulcrum axis, key-carrying toggle elements rockable about a common fixed fulcrum axis which is parallel to that of said members, each key-carrying toggle element carrying a different one of the keys of a set of keys which normally are arranged in straight horizontal rows progressively spaced from the fulcrum axis of said toggle elements, and second toggle elements each pivoted to a different key-carrying toggle element and rockable member at such points that the pivotally connected key-carrying and second toggle elements form toggles which, by identical depressions of the keys, are progressively unfoldable from congruently folded conditions to congruently less folded conditions in which the elements of each toggle are unfolded to an angle of not more than 90 degrees to rock the rockable members through their aforesaid identical angles of motion affording complete printing strokes of the type bars.

14. A system of type actions, as claimed in claim 13, wherein the distances from the pivotal connection between the two elements of each toggle to the fulcrum axis of the key-carrying toggle element and to the pivotal connection of the second element of the toggle with one of the rockable members both progressively increase from those of the toggles whose key-carrying elements support keys in the row of keys farthest from the fulcrum axis of the key-carrying elements to those of the toggles whose key-carrying elements support keys in the row of keys closest to the fulcrum axis of the key-carrying elements.

15. A system of type actions, as claimed in claim 14, wherein the pivotal connections of the key-carrying toggle elements with the second toggle elements normally lie in the nearest one to the set of keys, and the pivotal connections of the second toggle elements with the rockable members normally lie in the farthest one from the set of keys, of two planes which converge downwardly to the fulcrum axis of the rockable members, and wherein the fulcrum axis of the key-carrying toggle elements is farther from the set of keys than is the fulcrum axis of the rockable members.

16. A system of type actions, as claimed in claim 15, wherein the type bars are pivoted in normally cumbent positions in a case shiftable segment which curves upwardly above and transversely of the toggles and which pivotally supports the type bars to swing upwardly away from the set of keys to print at a common printing point.

17. In a typewriter, a type action comprising a pivoted and normally cumbent front strike type bar, an upstanding sub-lever fulcrumed at its lower end to rock fore and aft of the typewriter, a link connecting the upper end of the sub-lever to the type bar to swing the type bar upwardly and rearwardly in the typewriter to printing position in response to forward rocking of the sub-lever, a normally substantially fully extended toggle pivotally anchored in the typewriter at a fixed point forward of the sub-lever and pivotally anchored at its other end to the sub-lever intermediate the ends of the sub-lever, a key lever extending forwardly in the typewriter from a fulcrum axis about which the key lever is rockable downwardly and upwardly respectively from and to a normal position, and a second link pivotally connected at one end to the toggle and pivotally connected at its other end to the key lever to form with the key lever a second and normally acutely collapsed toggle, the first of which toggles is progressively foldable, and the second progressively unfoldable, toward a right angle condition of fold of the toggles by a downward rocking movement of the key lever of sufficient extent from the normal position of the key lever to swing the type bar from its normal cumbent position to its printing position.

18. In a typewriter, a type action, as claimed in claim 17, wherein the pivotal connection of the second link to the normally extended toggle, and the pivotal connection of said second link to the key lever, respectively, move substantially directly forwardly and substantially directly downwardly throughout downward rocking movements of the key lever which actuate the type bar from normal to printing position, the pivotal connection of the second link to the normally extended toggle normally being above and to the rear, and the pivotal connection of said second link to the key lever normally being above and to the front of, the pivotal anchorage to the typewriter of the normally extended toggle.

References Cited in the file of this patent

UNITED STATES PATENTS

| | | |
|---|---|---|
| 1,689,888 | Myers et al. | Oct. 30, 1928 |
| 2,072,878 | Helmond | Mar. 9, 1937 |